March 17, 1964   P. E. GLASER ETAL   3,124,853
PROCESS FOR FORMING INSULATION AND RESULTING PRODUCT
Filed May 19, 1960

Peter E. Glaser
Alexis Pastuhov
Laurence R. B. Hervey
INVENTORS.

BY
Attorney 3,124,853
PROCESS FOR FORMING INSULATION AND
RESULTING PRODUCT
Peter E. Glaser, Lexington, Alexis Pastuhov, Harvard, and Laurence R. B. Hervey, West Concord, Mass., assignors to Arthur D. Little, Inc., Cambridge, Mass., a corporation of Massachusetts
Filed May 19, 1960, Ser. No. 30,386
6 Claims. (Cl. 20—101)

This invention relates to insulation and more particularly to a process for forming insulation and the resulting product.

The very marked increase in the use of liquefied gases has indicated a need for more efficient insulation systems for storing and handling these extremely cold liquids with a minimum boil-off loss due to heat leaks. At the same time recently developed techniques in industry have dictated the need for more efficient high-temperature insulation systems. For example, the handling of molten materials, e.g., metals, which must be transported or stored requires extremely efficient high-temperature insulation. There are also a number of industrial processes which must be carried out at extremely high temperatures and which must be isolated for the sake of comfort, efficiency and safety.

The prior art concerned with low-temperature insulation has been directed primarily to the use of a vacuum with or without the use of an insulating material such as perlite, a finely divided volcanic glass. However, now with the requirement that systems must be capable of the insulation of liquids the temperatures of which may approach absolute zero, it is necessary to provide an insulation system to meet such a performance requirement. Moreover, the continuing growth of activity in the cryogenic field indicates a real need for an efficient, safe insulation system.

The prior art concerned with high-temperature insulation is essentially one which has developed as the requirements have become more stringent. High-temperature insulation began essentially with packing or wrapping with a number of poor heat conductors (ceramic fibers, asbestos and the like). It proceeded then to the use of evacuated areas surrounding the high temperature area to be insulated and then to the use of evacuated panels containing insulation materials. The art has also encompassed the use of numerous constructions and designs to lengthen heat leak paths and the like. Each of these prior art systems has been essentially satisfactory in providing insulation against the temperatures for which they were designed; but the use of continually higher temperatures demands more efficient high-temperature insulation systems. Such systems suitable for insulation of temperatures up to around 1000° F. are now known, but it is now desirable to provide insulation systems which are capable of handling (i.e., furnishing protection for) temperatures of the order of 4000° F. consistent with minimum weight and density, whether the temperature difference, $\Delta T$, is small or large.

In co-pending applications, Serial Nos. 807,351 and 839,693, filed in the names of Alfred G. Emslie, Warren A. Salmon and Peter E. Glaser, there are disclosed novel insulation materials which may be used to fill insulation structures. These insulation materials may also be used in connection with radiation shields in which the radiation shields are spaced apart and the insulation material is used to fill the spacings therebetween. In addition to the novel insulation materials disclosed in the above-identified co-pending applications, a number of other finely divided particulate materials are known, such as perlite, vermiculite and Santocel (a finely divided silica), which are suitable for this application.

In using these finely divided materials for insulation it has been customary to introduce them into an insulation structure, such as an annular spacing around a tank or a thin wall panel, by the process of sucking or blowing them in a fluidized state into the structure. The technique of sucking the finely divided material can be used where the structure is a pressure vessel. However, when a structure such as a thin-skinned vacuum insulation panel is used it is necessary to blow in the finely divided material. Thin-skinned vacuum insulation has the ability to carry and transmit loads imposed upon it after evacuation, and consists of a thin metal barrier confining the insulation. Either of these techniques possesses certain inherent disadvantages, among which is the difficulty encountered in obtaining a controlled density and of obtaining a constant density throughout the interior of the structure. Moreover, when the structures are diverted from simple geometrical shapes, i.e., are intricate configurations, the expedient of vibrating the insulation material to a desired density is almost entirely ineffective.

Moreover, with the advent of the use of radiation shields spaced apart by means of the insulation material, it has become difficult if not impossible to locate the radiation shields with the desired spacing in the insulation configurations once the insulation material is present. This is particularly true if more than one radiation shield is to be inserted for there is no sure way of inserting a plurality of such shields in such a manner that they will be equally spaced apart and will not touch. If, of course, one radiation shield touches another, the purpose of the insulation is defeated for there would then be established a good thermal heat path across the insulation structure.

Finally, these prior art techniques cannot be adapted to the forming of an insulating structure which has a composition gradient across its thickness, that is, the insulating structure had to be filled with one type of insulating material, for the sucking or blowing techniques of filling would not permit achieving a composition gradient.

It would therefore be desirable to have available a process which could make possible the construction of an insulating assembly in which the density of the insulating material could be controlled, varied and/or maximized. It would also be desirable to have a process by which an insulating assembly of the character described could be made so as to contain insulation material which exhibited a composition gradient across the thickness of the insulation structure and which also permitted the easy handling and insertion of a plurality of radiation shields.

By the process of this invention it is possible to form more-or-less rigid molded structures of insulating material using a fugitive bonding agent, insert it into a structure or coat it so as to give it an outside surface and then remove the bonding agent used originally to form the rigid structure, thereby to leave an insulating assembly of the character desired with the insulating material reverting to its original particulate state and densified to the desired degree.

It is therefore a primary object of this invention to provide a process by which insulating structures can be easily formed into any desired shape or configuration and contain finely divided particulate matter having a controllable density and composition. It is another object of this invention to provide a process by which insulating assemblies comprising alternating layers of an insulating material and radiation shields may be formed for incorporation into a desired structure. It is yet another object of this invention to form rigid insulation assemblies which may be further used to fill or insert into a structure or to be given a suitable skin or coat. These and other objects will become apparent in the following description of this invention.

The process and product of this invention may be further described with reference to the accompanying drawings in which.

By the process of this invention the finely divided, particulate insulating material to be used is mixed with a temporary or fugitive bonding agent and cast into a desired mold. The resulting molded form is then given a suitable coating or placed in a suitable structure and the fugitive or temporary binder is removed to leave the structure filled with the insulating material which reverts to its original particulate state and is present in a predetermined density.

Relatively thin layers may be cast of the insulating material and bonding agent and then the resulting thin sheets may be temporarily bonded to radiation shields to give a sandwich arrangement which in turn may then be given a suitable outside structure such as by electroforming metal around it, spray coating, or by slipping the assembly into a suitable casing.

As will be pointed out below, the casing or structure formed about the molded configuration or insulation assemblies may or may not be gas tight. Once the rigid insulation material or the sandwich type assembly with the radiation shields has been inserted into the desired structure or has been coated to give it an outside surface or skin, the fugitive bonding agent is removed and the insulating material is again in particulate form. It will be seen that by the proper choice of a bonding agent and by the use of a suitable ratio of bonding agent to insulation material, it is possible to control the density of the insulating material present in the final insulation assembly and at the same time to achieve a constant density throughout a given molded structure.

In the process of this invention the insulating material as a finely divided particulate matter (such as perlite, finely divided silica, vermiculite or the combinations of components disclosed in the above-identified co-pending applications) is mixed with the fugitive bonding agent to form a composition which may range in consistency from a dry mixture to a slurry, depending upon the bonding agent and the final density desired. This composition is then shaped into the desired configuration such as by pouring into a suitable mold form, and, if necessary, the bonding agent is activated. If the bonding agent is used as a solution or dispersion, part or all of the liquid solvent or dispersing agent may be removed. In any event, the bonded particulate matter is given sufficient structural strength to permit it to be handled. The resulting molded structure may then be further processed such as by slipping it into a preformed structure designed to contain it or by depositing on the surface of the molded structure a suitable skin or outside surface such as by electroforming metal around, or by coating it with a ceramic material or any other suitable coating composition.

Figure 1:
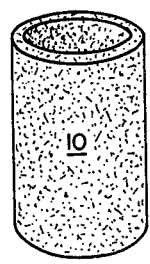
FIGS. 1 and 2 represent two typical configuration in which the insulating material of this invention may be molded in the process of this invention.

As one typical example, FIG. 1 illustrates how an annular ring may be cast of the insulating forming composition of finely divided insulation material and bonding agent. Such a ring could then be coated or suitably covered to give it a suitable surface or skin and in this form be used as a section of a space vehicle. It is interesting to point out that in such a form for use in space applications if it is not gas tight it would, in fact, be self-evacuating due to the differential in pressure of the gas within the insulating material and of the space surrounding it. The insulation of FIG. 1 could also, of course, be placed in a gas-tight structure in which case it could be evacuated and used as insulation around a vessel holding a cryogenic liquid.

Once the semi-rigid or rigid insulating material formed of the finely divided particulate matter and a suitable fugitive bonding agent has been cast into the desired shape and placed in a structure or has been given a suitable skin, the binder is removed, preferably by volatilization or sublimation. This may be accomplished under reduced pressures to make the removal of the bonding agent somewhat easier.

Figure 2:
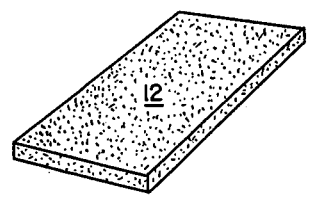
Figure 3:
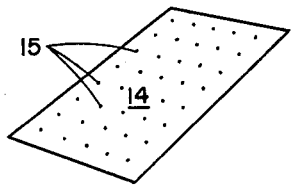
FIG. 3 illustrates a perforated radiation shield.

Another way of employing the process of this invention to the construction of a novel insulation is to use the molded insulation in conjunction with thin radiation shields. As pointed out above, it is very difficult to make such assemblies if the finely divided insulating material is first introduced into a structure before radiation shields are inserted. By the process of this invention, however, it is very convenient to make up a sandwich-like assembly of a plurality of radiation shields spaced apart with insulation material. For example, thin sheets of the insulating material of this invention may be made as illustrated in FIG. 2. In doing this the finely divided insulating material is cast into the thin sheet form 12 to give an insulating material temporarily bonded together. These sheets 12 may then be used as spacers between thin radiation shields 14 such as shown in FIG. 3. In forming the assembly it may be convenient to perforate the radiation shields 14 with holes 15 in order to expedite subsequent evacuation of the final insulation or to permit the entrapped air in the insulating assembly to escape in a self-evacuating assembly. A number of thin spacers 12 of the bonded insulation material is built up with radiation shields to form a sandwich-like assembly and, if desired, the radiation shields may be temporarily bonded to the spacers to give a self-supporting assembly. In using this type of assembly, it may be convenient to wrap or cover it for ease of further handling. Thus it may be given a temporary coating of wax, for example, the wax being subsequently removed. Or it may be wrapped in a film such as Mylar (a saturated polyester) or coated with a plastic or resinous material, the film or coating becoming an integral part of the final insulation.

Figure 4:
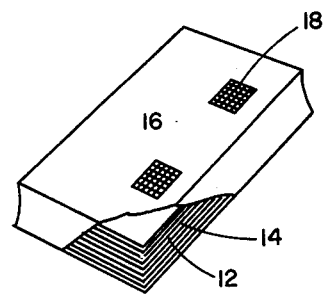
FIG. 4 shows a perspective view, partially in cross-section, of a thin-skinned insulation panel containing an insulation assembly made up of alternating layers of the insulating material of FIG. 2 and the radiation shields of FIG. 3.

In FIG. 4 an assembly of a plurality of radiation shields spaced apart by the insulation sheets has been given an outside supporting surface or skin 16, such as by electroplating. In the process of surfacing the assembly it may, of course, be desirable to treat a portion of the assembly so that it would not be surfaced to leave one or more openings into the resulting structure. Thus, for example, it may be desirable to leave one or more screened openings 18 such as shown in FIG. 4 through which the air in the assembly could be withdrawn in the evacuating process.

Figure 5:
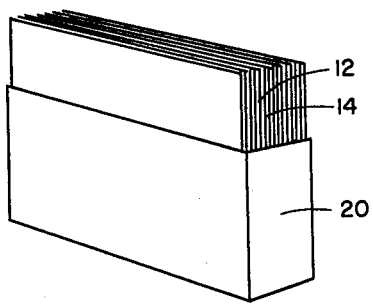
FIG. 5 shows how an assembly of the insulation of this invention may be preformed and inserted into a structure.

In FIG. 5 the assembly of radiation shields 14 and insulation spacers 12 is inserted into a structure 20. This structure may then be covered, and if desired made gas tight to render it capable of being evacuated.

In building up an assembly suitable for use in the insulating structures illustrated in FIGS. 4 and 5, it will be possible to achieve a composition gradient across the insulating structure. Thus, assuming for example that the thin wall insulation panel represented in FIG. 4 is to be used in a cryogenic application, e.g., to insulate liquid helium from ambient conditions, the insulation spacers 12 and the radiation shields 14 would be so chosen and varied in forming the assembly that those which were to come closest to the liquid helium would exhibit better low temperature insulating properties, while those spacers and radiation shields which were to be exposed to temperatures corresponding to ambient conditions would have characteristics best adapted for that particular temperature. Likewise, a gradient of materials between these two extremes could also be built up by using the proper insulation material and radiation shields in the center of the assembly. Thus there results an insulation structure which attains maximum efficiency because it is possible to use materials best adapted for insulation in the temperature range to which they are exposed in the insulating structure.

The fugitive bonding agents suitable for the practice of this invention are those which are nonsolvents for and essentially unreactive with the finely divided insulating material. These fugitive bonding agents should be readily and essentially completely removable by heat and/or reduced pressure so that no appreciable quantity of them will be present to influence the insulating characteristics of the final insulation. Preferably, the fugitive bonding agents are those which have relatively high vapor pressures at temperatures and pressures compatible with the handling of the insulation structure at the time when the insulation material is to revert to its finely divided state. Thus if the molded insulating material is to be handled at room temperature, such easily volatilized solids such as benzoic acid, naphthalene, camphor, or the chlorobenzenes such as paradichlorobenzene, may be used. If lower handling temperatures can be tolerated, then a sublimable material such as Dry Ice (solid $CO_2$) is suitable. In using a material such as naphthalene, benzoic acid or camphor it is preferable to introduce these bonding agents into the insulation material in a finely ground form and achieve bonding by melting the bonding agent in situ under pressure to form the desired configuration.

Volatile liquids which have freezing points within a range which can be conveniently handled, such as the lower alcohols, the ketones, and really volatilized aromatics such as benzene and xylene, may also serve as the bonding agent of this invention or as solvents for other bonding agents.

Another type of fugitive bonding agents are polymers which are thermoplastic in nature and which may be decomposed under heat and pressure to form volatile decomposition products. These polymers may, in the decomposition process, revert to their monomeric form. Examples of such polymers include, but are not limited to, polystyrene and the polyacrylates. These polymers may be applied to and mixed in the finely divided insulating material in the form of a finely divided material, as a solution or suspension. If a small amount of residual carbon is left after the decomposition of the fugitive bonding agents of this type, it will do no harm, for the carbon can serve as radiation absorption centers.

The final density of the finely divided insulation material in the insulation structure is controlled by the ratio of bonding agent to insulation material, and will depend upon the components used. Simple experimental trials will indicate the optimum ratio of bonding agent to insulation material required to obtain predetermined desired densities of the insulation material as finally present in the insulating structure.

The following examples, which are meant to be illustrative and not limiting, are given to further describe this invention.

*Example I*

The finely divided insulation material of this example was a composition containing 37.1% potassium titanate, 12.3% fine aluminum flakes, 12.3% carbon black and 29.2% pyrogenic alumina, and 9.1% finely divided silicon nitride by weight. In this insulation the potassium titanate and aluminum flakes served as radiant energy scattering and reflecting particles; the carbon black and alumina as radiant energy absorbing and re-emitting particles; and the silicon nitride as a carrier. This insulation material was a light fluffy material prepared in accordance with the teaching of the above-identified application Serial No. 807,351. The fugitive bonding agent used was naphthalene which had been recrystallized and ground to a fine powder.

Five hundred grams of the insulating material was thoroughly mixed with 1500 grams of the finely ground naphthalene. Some of the resulting mixture was then used to fill a mold which was a shallow rectangular tray and sufficient pressure and heat was applied to melt the naphthalene (melting point 176° F.). The resulting rigid sheet which was about one-eighth inch thick was cooled under pressure to prevent any substantial vaporization of the naphthalene and hence deterioration of the bonds thus formed.

Samples of the insulation sheet were then cut from it and used as spacers between equal sized sheets of 1 mil thick aluminum foil used as radiation shields. A small quantity of molten naphthalene was brushed on the surfaces of the aluminum foil which were to contact the insulation sheets and served as a temporary adhesive to bond the whole assembly together. A skin of 2 mil thick nickel was then electroformed around the entire assembly, leaving a small opening in the nickel skin. The naphthalene was then removed by heating the resulting insulation panel between 190 and 200° F. under vacuum conditions, e.g. 10 mm. Hg.

The resulting insulating panel was suitable for incorporation as a part of a thermal protection system for use in hypersonic speed vehicles.

In a similar manner sheets or wafers of about one-eighth inch thickness may be made up of varying insulation material compositions and the sheets used with radiation shields (which of course may also be varied) to form an insulation assembly having a composition gradient. Such a composition gradient, using radiation shields of different materials if desired, achieves a gradient in thermal characteristics across the insulation.

*Example II*

The insulation material of this example was a composition of 25% by weight carbon black having an average particle size of 30 millimicrons and 75% by weight of a pyrogenic silica sized between 10 and 40 millimicrons. The fugitive bonding agent was a commercial grade polystyrene made up in a 10% solution of xylene.

To about 500 grams of the insulating material was slowly added sufficient of the polystyrene solution to form a thick paste. The paste was introduced into an annular ring shaped mold and the xylene driven off by moderate heating (302° F.) in a drying oven. The insulation material-polystyrene mixture in the mold was then heated to about 400° F. while a pressure of 1000 p.s.i. was applied in order to melt the polystyrene. When the resulting molded insulation material was removed from the mold form, it was sufficiently rigid to be handled. It was inserted into a suitable insulating structure and the polystyrene removed by heating to about 675° F. until substantially all of the polystyrene had been volatilized and removed. The silica-carbon black mixture in the insulating structure was returned to its finely divided, fluffy form.

It will be seen from the above description and examples that by the process of this invention it is possible to make insulation structures of any configuration whatsoever and to use in these configurations a finely divided insulation material, the density of which may be varied and controlled. Moreover, there may be achieved a gradient in the insulating material thereby to provide a novel and highly efficient insulation.

We claim:

1. Process for forming insulation, containing finely divided particulate material at a predetermined density, comprising the steps of mixing said finely divided particulate material with a fugitive sublimable bonding agent, forming a solid molded shape of the mixture by applying sufficient heat and pressure to said mixture to bond said particulate material, incorporating said shape within an insulation structure, and removing said bonding agent through sublimation subsequent to incorporating said shape within said insulation structure thereby to cause said material to revert to its original finely divided particulate condition in said insulation.

2. Process in accordance with claim 1 wherein said incorporating step comprises surrounding said molded shape with an outside skin.

3. Process for forming an insulation structure containing finely divided particulate matter as insulating material, comprising the steps of mixing said insulating material with a fugitive sublimable bonding agent thereby to form a castable mixture, casting said mixture in a mold form, subjecting said mixture to sufficient heat and pressure to form a solid molded shape, introducing said molded shape into an insulation structure and heating said structure containing said molded shape thereby to sublime and remove said bonding agent and to cause said insulating material to revert to its original finely divided particulate condition in said insulation structure.

4. Process in accordance with claim 3 wherein said finely divided particulate matter is a mixture of potassium titanate, aluminum flakes, carbon black and alumina.

5. Process in accordance with claim 3 wherein said bonding agent is naphthalene.

6. Process for forming an insulation structure, comprising the steps of mixing a finely divided insulating material with a fugitive sublimable bonding agent, forming the resulting mixture into sheets which are at least semi-rigid by the application of heat and pressure to the mixture of said insulating mixture and said bonding agent, building up an insulation assembly by alternating said sheets with radiation shields until a desired thickness is formed, incorporating said assembly into an insulation structure and heating said structure to sublime and remove said bonding agent.

References Cited in the file of this patent

UNITED STATES PATENTS

| 1,688,849 | Bellamore | Oct. 23, 1928 |
| 2,128,336 | Torstensson | Aug. 30, 1938 |
| 2,175,630 | Kiesel | Oct. 10, 1939 |
| 2,863,179 | Gaugler | Dec. 9, 1958 |
| 2,896,271 | Kloote | July 28, 1959 |
| 2,967,152 | Matsch | Jan. 3, 1961 |
| 3,009,601 | Matsch | Nov. 21, 1961 |
| 3,014,872 | Scott | Dec. 26, 1961 |
| 3,022,190 | Feldman | Feb. 20, 1962 |

FOREIGN PATENTS

| 21,310 | Australia | 1936 |
| 683,855 | Great Britain | 1953 |